United States Patent [19]

Calderon

[11] Patent Number: 4,927,430

[45] Date of Patent: May 22, 1990

[54] METHOD FOR PRODUCING AND TREATING COAL GASES

[76] Inventor: Albert Calderon, P.O. Box 126, Bowling Green, Ohio 43402

[21] Appl. No.: 198,862

[22] Filed: May 26, 1988

[51] Int. Cl.$^5$ .............................................. C10J 3/62
[52] U.S. Cl. .................................... 48/197 R; 48/203; 48/210; 55/73; 55/79; 201/2.5; 201/16; 423/230
[58] Field of Search ...................... 201/16, 26, 32, 2.5; 48/197 R, 203, 210; 518/702, 705; 252/373; 60/39.02, 39.12, 648, 645; 423/230, 569; 202/137, 114, 112; 55/73, 79

[56] References Cited

U.S. PATENT DOCUMENTS

| | | | |
|---|---|---|---|
| 2,634,198 | 4/1953 | Kalbach | 201/16 |
| 2,992,065 | 7/1961 | Feustel et al. | 55/79 |
| 4,058,205 | 11/1977 | Reed | 201/16 |
| 4,210,491 | 7/1980 | Schulman | 201/2.5 |
| 4,247,367 | 1/1981 | Reilly | 201/16 |
| 4,261,167 | 4/1981 | Paull et al. | 60/39.12 |
| 4,609,541 | 9/1986 | Calderon | 423/569 |
| 4,729,217 | 3/1988 | Kehlhofer | 60/39.02 |

OTHER PUBLICATIONS

Electric Power Research Institute Report, AP-3109, Project 2207, "Coal Gasification Systems: A Guide to Status, Applications, and Economics", Jun. 1983, pp. (5-153)-(5-156).

U.S. Dept. of Energy, Progress Report One, Jan. 1988, "Assessment of Costs and Benefits of Flexible and Alternative Fuel Use in the U.S. Transportation Sector", pp. 10 and 11.

Primary Examiner—Joye L. Woodard
Attorney, Agent, or Firm—MacMillan, Sobanski & Todd

[57] ABSTRACT

A method of generating a de-sulphurized volatile matter and a relatively low Btu gas includes the initial step of pyrolyzing coal to produce volatile matter and a char. The volatile matter is fed to a first de-sulphurizer containing a de-sulphurizing agent to remove sulphur therefrom. At the same time, the char is gasified to produce a relatively low Btu gas. The low Btu gas is fed to a second de-sulphurizer containing the de-sulphurizing agent to remove sulphur therefrom. A regenerator is provided for removing sulphur from the de-sulphurizing agent. Portions of the de-sulphurizing agent are moved among the first de-sulphurizer, the second de-sulphurizer, and the regenerator such that the regenerator regenerates the de-sulphurizing agent. Preferably, the portions of the de-sulphurizing agent are moved from the second de-sulphurizer to the first de-sulphurizer, from the first de-sulphurizer to the regenerator, and from the regenerator to the second de-sulphurizer.

14 Claims, 4 Drawing Sheets

METHOD FOR PRODUCING AND TREATING COAL GASES

BACKGROUND OF THE INVENTION

This invention cogenerates liquid transport fuels and electric power from a gasifiable material such as coal, in an environmentally acceptable and cost effective manner. This objective meshes exactly with the immediate needs to reduce dependency on imported petroleum products, which are causing serious problems to the balance of trade of the United States, and also, to reduce air pollution in general and particularly from coal-burning utilities which are suspected of causing "acid rain."

Petroleum imports reduction will be accomplished through the substitution of clean synthetic fuels from coal for transport (and other uses) in place of petroleum products, and clean electric power will be accomplished through the reduction of $SO_2$ and $NO_x$ emissions. These accomplishments result from the separate production of gases and vapors through pyrolysis of coal which are directed through a first hot-bed cleanup system which in turn causes the molecular rearrangement of the gases and vapors yielding substantially $H_2$ and CO and thus produce a clean feedstock syngas which is synthesized into clean fuels such as methanol, and the separate production of a low Btu gas through char gasification with air which is directed through a second hot-bed cleanup system to produce a clean low Btu gas which is burned in a power cycle to efficiently cogenerate clean electric power with the emission of very low levels of $NO_x$ and $SO_2$. This invention is applicable to new "grassroots" facilities as well as to the repowering of existing power plants.

This invention relates to the cogeneration (coproduction) of clean liquid fuels for transport and other uses as well as clean electrical energy from gasifiable materials such as coal. Other materials may also be used. By way of example, reference will be made to coal in the following description, to denote a gasifiable material; this shall not be construed as a limitation but as a convenience for explanation purposes. The cogeneration of liquid fuel for transport and other uses, and electric power are conducted in such a way as to be economical and environmentally acceptable. The United States and other coal producing nations must reduce their dependency on imported petroleum, and further, clean electric power must be produced to maintain modern life. For example, U.S. Department of Energy Assessment dated January 1988 and Solicitation Number DE-PS01-88FEb1530 addresses the dependence on foreign oil and its inherent dangers to this country and the Solicitation stresses the specific objective of solving emissions of $SO_2$ and $NO_x$ from existing coal-burning facilities.

This invention specifically addresses the needs for both clean liquid fuel such as methanol and clean electric power; it is configured to convert the volatile content of coal to a clean feedstock suitable for conversion to chemicals including liquid transport fuel such as methanol, and the residual char to a clean fuel gas under pressure suitable for efficient and clean electrical power production with very low levels of $NO_x$ and $SO_2$ emission.

A number of distinct approaches to the production of liquid fuels and electrical power from coal have been developed but all of these approaches except for one which shall be described hereinafter, either address the production of liquid fuels per se or the generation of electrical power per se.

There are three processes for the production of liquid fuels from coal. The first process is the feed of syngas $(CO + H_2)$ derived from gasification of coal with relatively pure oxygen, into a synthesis loop. This process is expensive as there is the need for an oxygen plant and a shift reactor. The second process is the recovery of hydrocarbon liquids recovered from coal by coking. These liquids require cooling for the separation of condensables from non-condensables and must then be upgraded by the addition of hydrogen. The bulk of these liquids have been declared to be hazardous, particularly benzene. Further, during the separation of the condensables from the non-condensables which is accomplished by quenching with water, a very serious water pollution problem is created. The third process is concerned with the direct conversion of the organic content of the coal into liquid hydrocarbons by heat, pressure and the reaction with hydrogen. The recovered liquids are then treated again with additional hydrogen to yield a fuel product. This process is very expensive, operates at very high pressures (circa 2500 psi), requires sources of hydrogen and produces a by-product which is suspected of being hazardous.

There are three processes for the production of electric power from coal. The first is the combustion of coal in a boiler to support a steam cycle turbo-generator. Limestone scrubbing is used to remove sulfur from the flue gas, thus requiring disposal of sludge. The second is a fluidized bed which also uses limestone and generates solid waste. The third is the integration of coal gasification to combined cycle; in this process, the coal is converted to gas by partial oxidation, and the gas is then used as a fuel in a gas turbine to produce power while the hot turbine exhaust gases are used to raise steam for additional power generation.

The process referred to above for the coproduction of both methanol (liquid fuel) and electric power is the process described in the Electric Power Research Institute publication entitled *Coal Gasification Systems: A guide to Status, Applications, and Economics*, Project #2207, dated June 1983, pages 5-153, 5-154, 5-155 and 5-156. As is described in this reference, the once-through reaction system to make methanol from coal consists of positioning in series the gasification plant, the methanol reactor and the power generation equipment. Initially the coal is gasified at high pressure (850 psi) with oxygen and steam, the gas is cooled, desulfurized and then passed as a syngas through the methanol reactor for a single pass. For this reason the process is called "Once-Through" to convert some of the syngas into methanol. The rest of the syngas is used to generate power.

The disadvantages of the Once-Through method referenced are the following:

1. The yield of methanol is quite low because the proportions of the $H_2$ and CO in the gas are not conducive to give a high yield as the requirement for a maximum yield is a ratio of $H_2$ to CO of $+2$ (see line 17, first paragraph, page 5-153). As stated on top of page 5-154, the gas is inherently high in carbon monoxide.

2. The method requires an oxygen plant. This leads to a very expensive cost increment to the coal gasification plant. Further, when gasifying with oxygen, steam must be injected through the tuyeres in the reaction zone in order to moderate the temperature in this zone.

Therefore these requirements add to the cost of the gas produced.

3. The medium Btu gas (syngas) produced and which is used for the electric power generation (combined cycle) produces excessive amounts of $NO_x$ (a serious polluter). Water or steam must be injected in the combustion chamber to maintain the combustion temperature relatively low in order to keep the formation of $NO_x$ at a minimum. Such injection of water or steam lowers efficiency and increases costs and wastewater.

4. The method creates an incompatibility of pressures which increase capital costs. To make methanol a pressure of about 850 psi is required to convert syngas ($2H_2$ +CO) to methanol. To generate power, a maximum pressure of only 350 psi is required when using combined-cycle electric power generation. With today's knowledge and in today's environment, combined cycle power generation is the most efficient way of commercially producing electricity. This efficient way is penalized by having to operate a complete system at a pressure of 850 psi in order to convert some of the syngas into methanol. The construction of equipment such as coal charging mechanisms, pressure vessels, pumps, valves, piping, etc. must be sized to take such high pressure, yet the bulk of the gas is not converted to methanol but used for power generation which requires much lower pressure. As stated on top of page 5–153, the Once-Through methanol process is integrated with coal gasification and combined cycle electric power generation.

Oxides of Nitrogen ($NO_x$) which cause a very serious pollution problem to the environment are generated when burning fuels at high temperature. Low Btu gases are known to burn cooler and therefore generate the least $NO_x$. For example, reference FIG. II from the June, 1983 issue of *Power* shows the formation of $NO_x$ in parts per million upon combustion of various fuels. It is to be noted that a low Btu gas of 130 Btu per cu. ft. produces at 2000° F. combuster exit temperature about 20 parts per million of $NO_x$; whereas, a medium Btu gas (300 Btu's per cu. ft.) which is produced from oxygen blown gasification produces about 280 parts per million at 2000° F. exit temperature. This is a 1400 percent increase in $NO_x$ emission. The instant invention produces a gas of 110 Btu per cu. ft. and therefore should produce less than 20 parts per million. In the case of methanol, it is to be noted that it produces 70 parts per million of $NO_x$ as compared to 230 parts per million for No. 2 fuel oil, or a 329% increase in $NO_x$ emission when using No. 2 oil. Therefore, the thrust of this invention is to produce both gases and liquid fuels which when combusted produce very low levels of $NO_x$. In addition, the gases produced are desulfurized prior to usage to reduce the sulfur content (mainly $SO_2$) of the gases to very low levels also.

With the above considerations in view, the main object of this invention is to cogenerate both clean liquid fuels (methanol) and clean electric power from coal in a very cost effective manner.

Another object of the instant invention is to coproduce from coal clean transport fuels like methanol and clean electric power without the need for an oxygen plant for gasification which is very costly, and which produces a relatively polluting gas.

Still another object of this invention is to convert a significant portion of the coal into clean fuel or chemicals.

Further still another object of this invention is to operate the coal gasification at a pressure dictated by the pressure required for combined cycle power generation rather than the much higher pressure required to synthesize gas into methanol.

Further yet another object of this invention is to operate a gasification process that yields a syngas of a ratio of $H_2$ to CO of 3 to 1 which far exceeds the requirement for feedstock specification for making methanol, this being accomplished without a shift reaction.

Therefore another object of this invention is to efficiently produce clean electric power using a dilute low Btu gas (110 Btu/cu. ft.) produced from coal in order to keep the formation of $NO_x$ (a serious pollutant) at very low levels.

It is still another object of the present invention to provide a method for producing clean-burning methanol as a clean byproduct fuel from coal to substitute polluting petroleum derived fuels.

It is yet another object of the present invention to provide a method that will cogenerate both methanol and electric power from coal with a low capital investment requirement.

It is further yet another object of the present invention to provide a method which makes use of vast domestic coal reserves in a cost effective and environmentally acceptable manner to permit the United States and other coal producing nations to reduce their dependency on imported petroleum.

It is therefore yet another object of the instant invention to provide a method that is specifically configured to convert the volatile matter of the coal feed into a clean feedstock by thermally rearranging the molecular structure of said volatile matter to yield substantially $H_2$ and CO for the production of chemicals and particularly clean transportation fuels, and also to convert the residual char to a clean fuel gas of such low Btu content as to maintain the creation of $NO_x$ (a serious pollutant) to very low levels upon its combustion.

It is still further another object of the instant invention to provide a method capable of economically coproducing a clean fuel for transport and a clean fuel for power from coal with very low levels of sulfur economically.

These and other objects of the instant invention will become more apparent to those skilled in the art to which this invention pertains and particularly from the following description and appended claims.

SUMMARY OF THE INVENTION

The instant invention integrates the following steps:

The gases and vapors derived from pyrolysis of coal and the gases produced from air-blown gasification of the char (coke) left over from the coal after its pyrolysis, are essentially kept separated to prevent nitrogen contained in the gases produced from air blown gasification to mix with the gases and vapors derived from pyrolysis; and the gases and vapors derived from pyrolysis of the coal are directed through a first hot bed of a desulfurizing agent such as lime (CaO) to thermally cause the molecular rearrangement of the gases and vapors to substantially convert all of them to an essentially sulfur-free $H_2$ and CO synthetic gas with $H_2$ being the predominant gas and the $H_2$ and CO gas is synthesized to a desired compound such as methanol; and the gases produced from air blown gasification of the char remaining from the coal after pyrolysis are directed through a second hot bed of a desulfurizing agent such as lime to cause the desulfurization of said gases produced from gasification of said char to result in the formation of a dilute clean low Btu gas with nitrogen being the predominant gas, and the clean, dilute low Btu gas is burned to generate clean electric power with the creation of very low levels of $SO_2$ and $NO_x$ emissions.

Reference is now made to the accompanying drawings forming a part of this specification wherein like reference characters designate corresponding parts in the various views. It is to be understood that the embodiments shown herein are for the purpose of description and not limitation.

Before proceeding with the detailed description of the invention, reference will be made by way of example to the production of methanol from the $H_2$ and CO derived from the pyrolysis gases and vapors; of course other synthetic chemicals and fuels can be produced from the CO and $H_2$ depending upon the desired need.

DETAILED DESCRIPTION OF THE INVENTION

Figure 1:
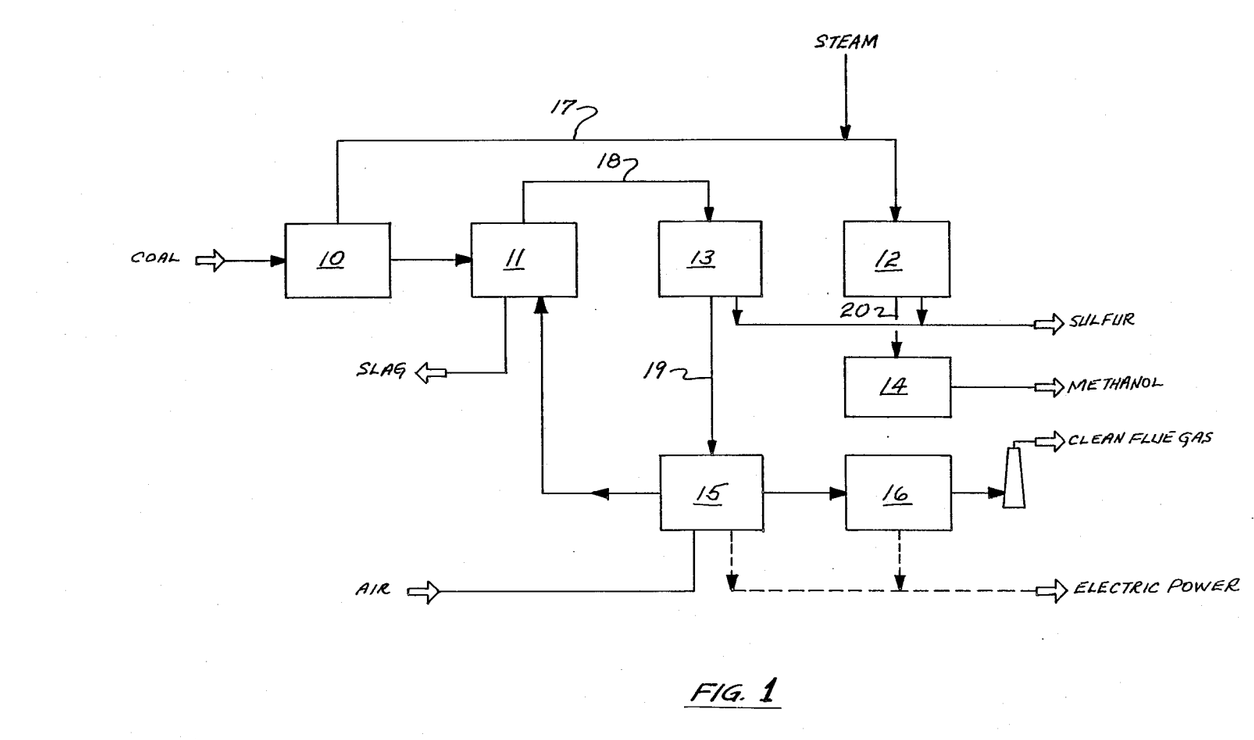
FIG. 1 is the general flow diagram of the complete method.

In FIG. 1 reference numeral 10 is the pressurized pyrolysis chamber and numeral 11 is the pressurized char gasification chamber; numeral 12 is the first hot bed for desulfurization and molecular rearrangement of the volatile matter and numeral 13 is the second hot bed for desulfurization of the dilute low Btu gas; numeral 14 is the synthesis plant for reconstituting $H_2$ and CO to make methanol; numeral 15 is the combustion turbine where the low Btu gas is burned and numeral 16 is the steam turbine which operates on steam raised from the waste heat from the gas turbine. Both the gas turbine and the steam turbine produce clean electric power.

Figures 2, 7, 9:
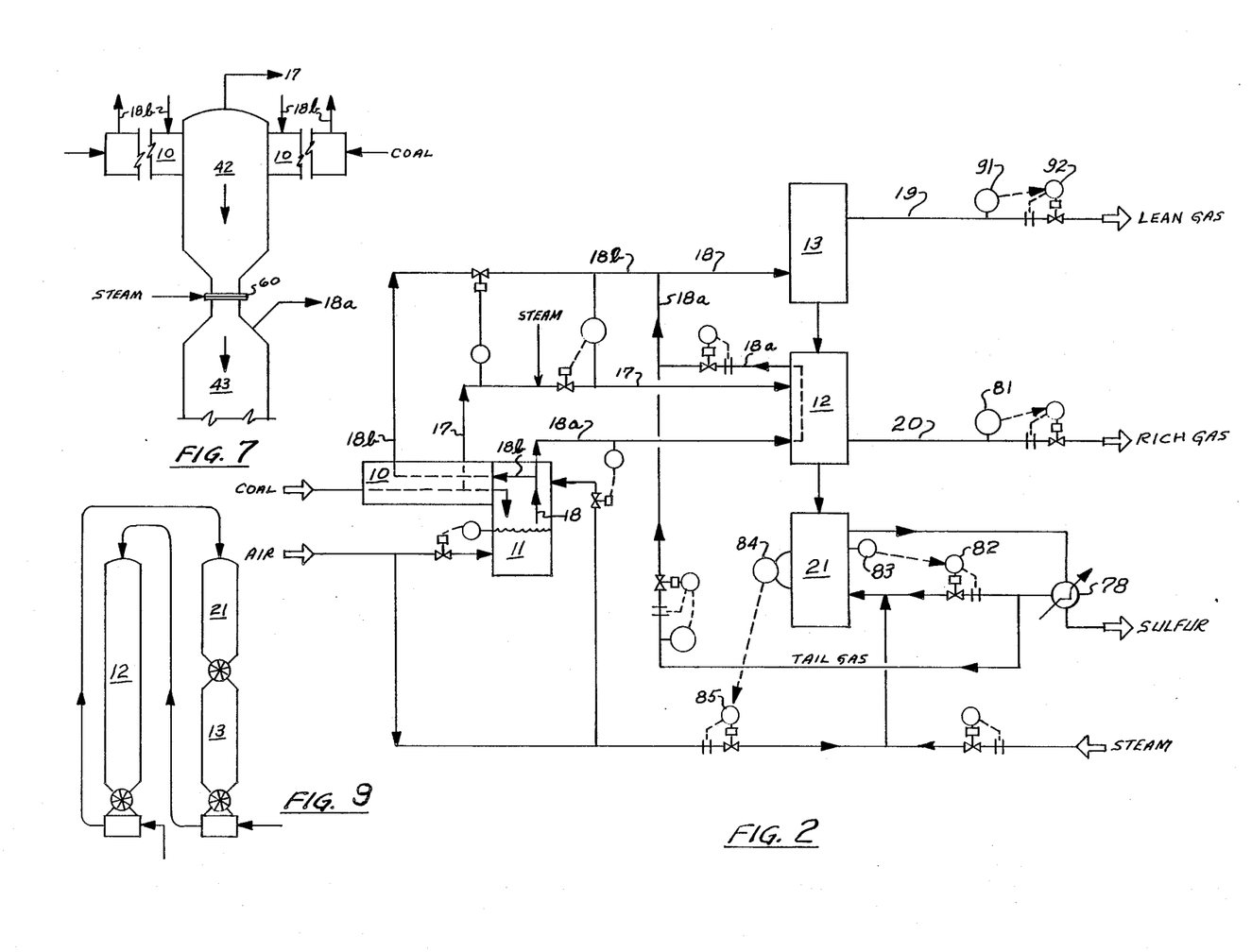
FIG. 2 is a detailed flow diagram showing the various streams and controls.
FIG. 7 is an alternate illustration of means to maintain separation of the gases derived from pyrolysis from gases produced from gasification.
FIG. 9 is a diagram showing a variation of FIG. 8.

Referring to FIG. 2 for a more detailed description, pyrolysis chamber 10 by way of example, is shown to be horizontally disposed to gasification chamber 11 and interconnected to it. Gas duct 17 communicates pyrolysis chamber 10 to first hot-bed cleanup 12. The raw low Btu gas from char gasification denoted by numeral 18 is preferably split into two streams, 18a and 18b and then rejoined to form stream 18 again prior to its entering second hot-bed cleanup 13; the raw low Btu gas from the char gasification may first flow through a hot cyclone (not shown but known in the art) for particulate removal prior to being split into streams 18a and 18b.

The intent is to use the high level heat of the raw low Btu gas 18, to accomplish two purposes: (a) the indirect heating of the coal contained in pyrolysis chamber 10, and (b) the indirect heating of the desulfurization agent, preferably lime, contained in the first hot-bed cleanup 12. Therefore the hot, low Btu gas generated in gasification chamber 11 (as stated after particulate removal) is split into two streams 18a and 18b. Stream 18a is directed to hot-bed cleanup 12 to indirectly heat the lime contained therein, and stream 18b is directed to pyrolysis chamber 10 to indirectly heat the coal contained therein. Both streams 18a and 18b constituting the low Btu gas are joined after the removal of their high level heat and are directed to second hot-bed cleanup 13 by means of gas duct 18. The low Btu gas is desulfurized in hot-bed cleanup 13 and it leaves as a clean dilute low Btu gas with $N_2$ being the predominant component of this gas, which gas is hereinafter called "lean gas" and which is in turn directed via gas line 19 for consumption in a combustion chamber. This lean gas may be expanded prior to combustion depending upon the pressure of the combustion chamber in which it is burned such as in a conventional atmospheric boiler; if the lean gas is burned in a gas turbine this gas is unexpanded prior to its combustion.

The gases and vapors leaving pyrolysis chamber 20 via gas duct 17 preferably enter the top of first hot-bed cleanup 12 and the gases and vapors are caused to come in direct contact with the hot (1200° F. to 2000° F.) bed of lime (or any other desulfurization sorbent) which is preferably in the form of pellets. The gases and vapors are made to flow through the interstices of the lime pellets to simultaneously remove the sulfur species in the gases and vapors and to break up the large molecules of the vapors and to rearrange the molecules in order to result in a clean syngas whose composition is substantially $H_2$ +CO with $H_2$ being the predominant component of the gas ($3H_2$ to 1CO), hereinafter called "rich gas." This rich gas leaves hot-bed cleanup 12 via gas line 20 which after cooling, is directed to methanol plant 14 where it is further cleaned, compressed to synthesis pressure (about 850 psi) and synthesized into methanol or any other desired synthetic compound.

The structure of the synthetic methanol plant 14 (FIG. 1) is common art and forms no part of this invention.

The movement of the lime (desulfurizing sorbent) is preferably accomplished in this manner. The lime which as stated is in pebble form, moves from hot-bed cleanup 13 to hot-bed cleanup 12 and thence to bed 21 for regeneration and for elemental sulfur release. The release of sulfur during regeneration is the subject matter of an invention of the applicant bearing U.S. Pat. No. 4,609,541.

Figures 3, 4, 6:
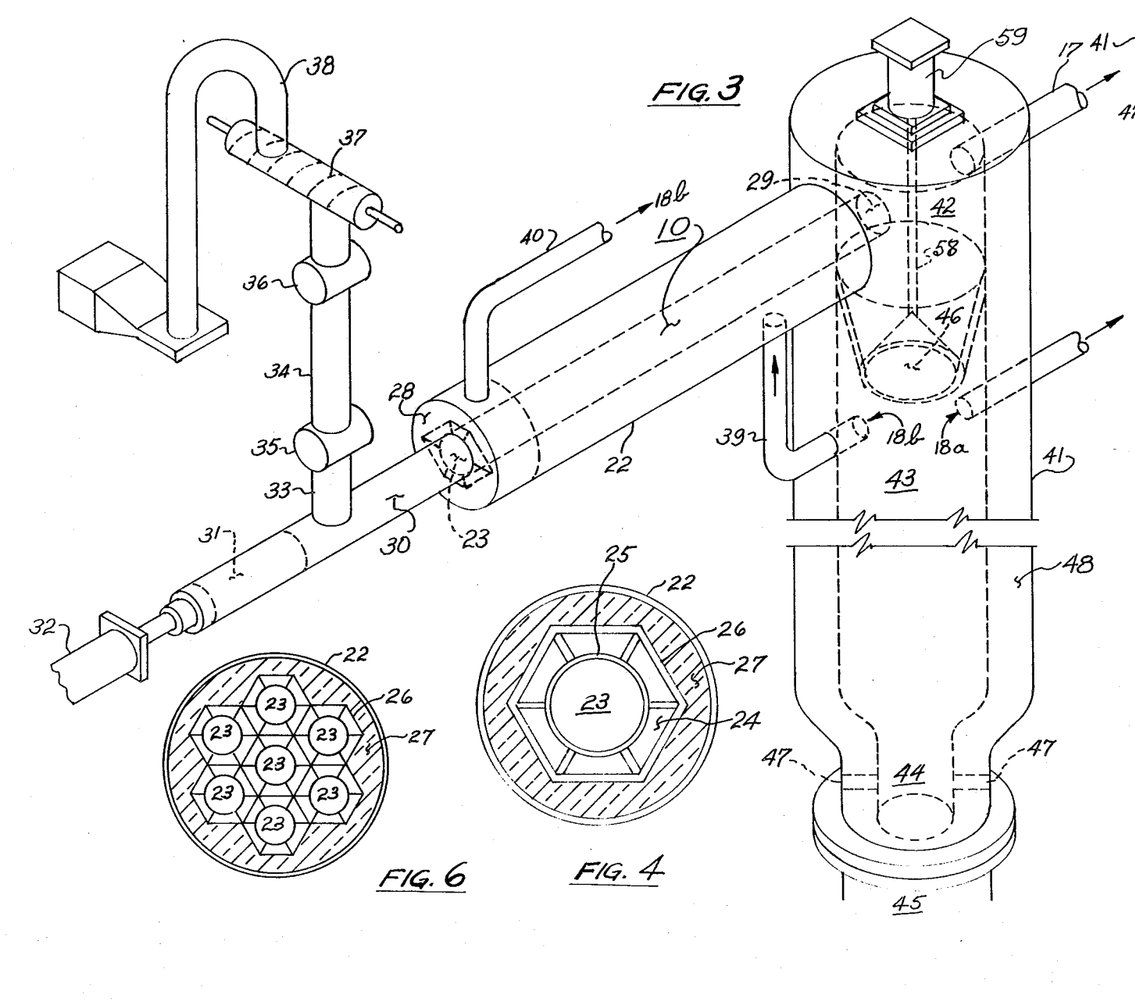
FIG. 3 is a schematic drawing of one possible arrangement of a pyrolysis chamber integrated to a gasification chamber.
FIG. 4 is a section through the pyrolysis chamber showing a single heating element.
FIG. 6 is a section through the pyrolysis chamber showing a bundle of heating elements.

Referring to FIG. 3 and 4 for a more detailed description, pyrolysis chamber 10 is shown horizontally disposed to gasification chamber 11. Pyrolysis chamber 10 consists of pressure vessel 22 within which heating element 23 is disposed. Heating element 23 is built in such a manner as to have gas passages 24 exterior of element 23 in order to provide for the indirect heating of the coal contained within heating element 23 which serves as the pyrolyzing chamber proper. Hot lean gas in passages 24 heat wall 25 and wall 25 in turn heats the coal. In order to contain the hot lean gas in passages 24, shell 26 is provided. Insulation 27 is interposed between shell 26 and pressure vessel 22 in order to minimize heat loss. To increase productivity a plurality of heating elements such as element 23, forms a bundle of heating elements housed within pressure vessel 22 as shown in section, in FIG. 6.

Pyrolysis chamber 10 possesses a charging end 28 and a discharging end 29. A charging mechanism 30 is disposed at end 28, and it may comprise piston 31, actuator 32, riser 33, lock-chamber 34, lower control valve 35, upper valve 36, metering screw 37 and coal elevator 38. Charging mechanism 30 feeds the coal incrementally into heating element 23, without pressure loss and without causing emissions during the introduction of the coal into pyrolysis chamber 10. As coal is charged into end 28, char is discharged from end 29 which is fed into gasification chamber 11. Charging mechanism 30 may take a different form as for example a screw. Provisions are made for duct 39 to engage passage 24 near discharge end 29 (cyclone for particle removal obviated for simplicity of description) for directing the lean heating gas countercurrent to the movement of the coal through passage 24 to heat wall 25 of heating element 23. The lean gas which is used for heating, after losing its high level heat indirectly to the coal contained within heating element 32 via wall 25, leaves pyrolysis chamber 10 through duct 40 which is disposed near coal charging end 28. A material such as corn, as disclosed in applicant's pending patent application bearing Ser. No. 07/162,406 filed on March 1, 1988, may be added to hasten the pyrolysis of the coal. Oil or tire scrap may also be added with coal and to hasten the pyrolysis of the coal still further.

Char gasification chamber 11 which is configured as pressure vessel 41 and lined with refractory 48 is preferably subdivided into four zones. The first zone, denoted by numeral 42, is the top of chamber 11 and serves for maintaining the segregation of the gases and vapors of pyrolysis from the gases produced from gasification; zone 42 is also where the gases and vapors derived from pyrolysis are separated from the char. The gases and vapors of pyrolysis leave zone 42 via duct 17. The char is fed by gravity through char-dump bell 46 downward into zone 43 which comprises the second zone. This second zone is a vertical column for the containment of an inventory of char and for the conversion of $CO_2$ to CO by reacting $CO_2$ with hot char. The third zone, denoted by numeral 44, is the reaction zone where the char is gasified with air. The conversion of the char to gas takes place in reaction zone 44. Air under pressure and preferably preheated air, is injected through tuyeres 47, by means of pipe 49 shown in FIG. 5. The fourth zone, identified by numeral 45, is for the removal of molten slag and shown in greater detail in FIG. 5. This fourth zone comprises a nozzle 50, heating flue 51, burner 52, quenching hopper 53, lock hopper 54 and cold slag holder 55. Valves 56 and 57 serve to isolate lock hopper 54 from gasifier 11 during the discharge of the quenched slag.

Referring back to FIG. 3 zone 42, char-dump bell 46 is provided with vertical rod 58 for raising or lowering it. Rod 58 is in turn actuated by actuator 59 in order to discharge the char from zone 42 to zone 43. Zone 42 and zone 43 may be configured as shown in FIG. 7 wherein char-dump bell 46 is obviated by making zone 42 in the form of a separate pressure vessel with a constriction such as throat 60. Provision for steam injection in throat 60 is provided to segregate the gases and vapors of pyrolysis from the gases of air blown gasification. Zone 42 may be supplied with char and gases from more than one pyrolysis chamber 10 as also shown in FIG. 7.

Figure 8:
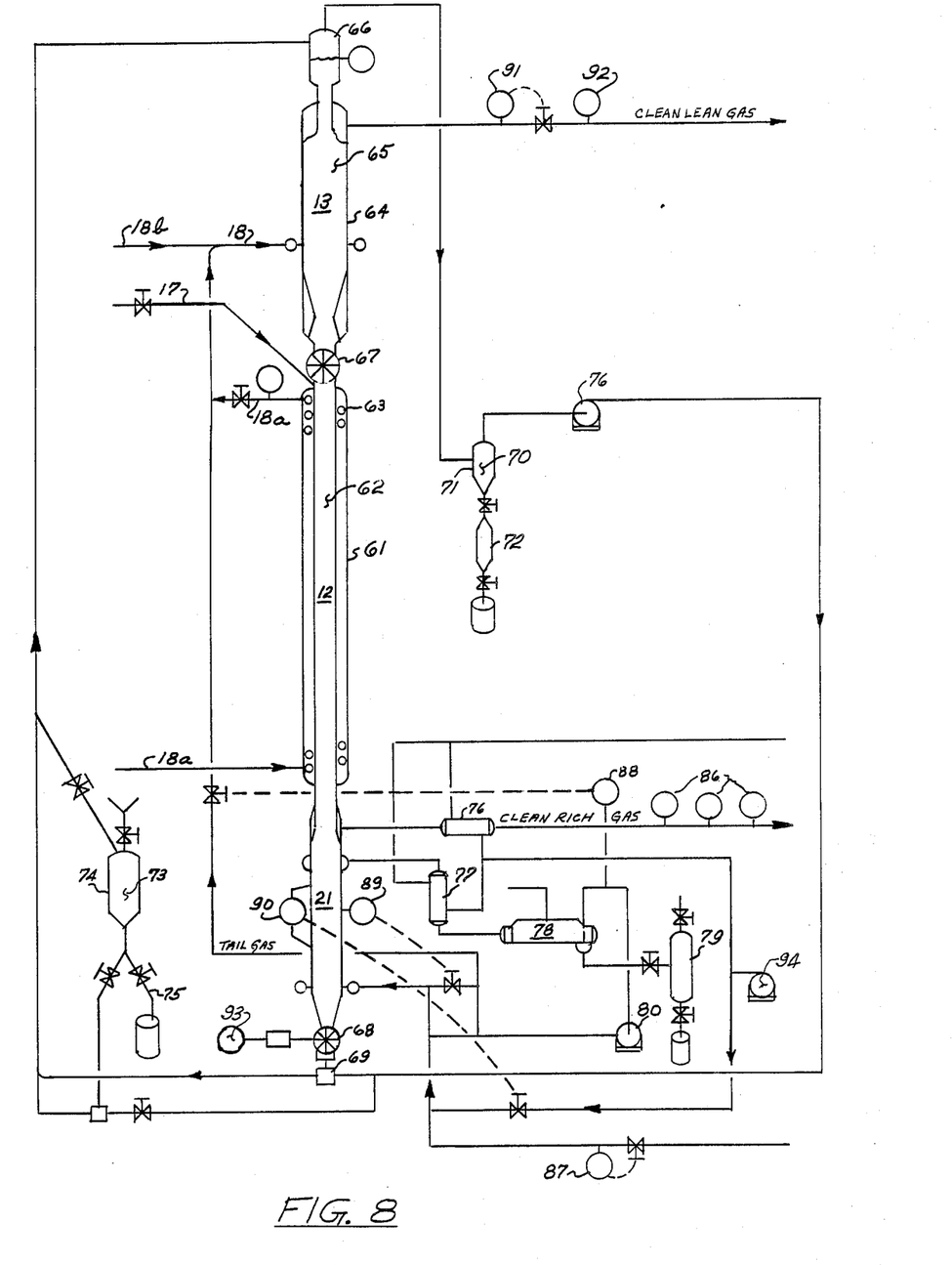
FIG. 8 is a diagram of the subsystem for causing the molecular rearrangement of the gases and vapors derived from pyrolysis and the desulfurization of the gases produced from the gasification of char.

Referring to FIG. 8 for a more detailed description of hot-bed cleanup 12 for the rich gas of pyrolysis and hot-bed cleanup 13 for the lean gas of gasification, for convenience, hot-bed cleanup 13 is shown above hot-bed cleanup 12 and regeneration chamber 21 beneath hot-bed cleanup 12. These beds may assume any practical arrangement in relation to one another.

Hot-bed cleanup 12 is configured as pressure vessel 61 and internal heating chamber 62. The sorbent (desulfurizer), which may be lime in pebble form, is contained in heating chamber 62. One mode of heating the lime may take the shape of spiral flue 63 disposed between pressure vessel 61 and heating chamber 62. Hot gases are directed through spiral flue 63 to indirectly heat the lime contained within heating chamber 62. Other modes of heating the lime may also be used.

Hot-bed cleanup 13 is configured as pressure vessel 64 with internal lime containment chamber 65 and overhead surge hopper 66. Star valve 67 interconnects hot-bed cleanup 13 to hot-bed cleanup 12. The intention is to have hot lean gas heat the bed of lime in hot-bed cleanup 13 by direct contact and hot-bed cleanup 12 by indirect contact, or any other practical heating method of both beds.

Beneath hot-bed cleanup 12, regeneration chamber 21 is equipped with star valve 68 disposed at the bottom of chamber 21. Gas lift system 69 is used to transport the regenerated lime (sorbent) from the bottom of regeneration chamber 21 to the top of surge hopper 66 and by gravity the lime pebbles are fed from hopper 66 to hot-bed cleanup 13 and from hot-bed cleanup 13 to hot-bed cleanup 12 and from hot-bed 12 to regeneration chamber 21. Gas lift system 69 has provisions 70 for removal of fines from the recycling gas through cyclone 71 and lock-hopper 72, and provision 73 for addition of fresh lime to the system through lock hopper 74 and removal of spent lime from the system through side discharge 75. Blower 76 is used as the prime mover for the gas lift system. A system for heat removal such as heat exchanger 76 is provided to cool the rich gas ($H_2$ and CO), subsequent to the catalytic molecular rearrangement of the gases and vapors of pyrolysis in hot-bed cleanup 12. A second system for heat removal such as heat exchanger 77 is provided to cool the regeneration gas prior to entry into sulfur condenser 78 which in turn is equipped with sulfur flash vessel 79. Blower 80 is provided to recycle some of the tail gas from sulfur condenser 78 to regeneration chamber 21, and the rest of the tail gas is directed to the lean gas prior to cleanup in hot-bed cleanup 13. Pump 94 serves to recycle the condensate. FIG. 9 is an alternate configuration which may be used to decrease the overall height of the lime lift system. Other configurations may also be used.

Operation

Referring to FIGS. 1, 2, 3, 4, 5 and 8, and assuming that the method is to start from cold. Char is charged through pyrolysis chamber 10 and establish the normal level in gasification chamber 11. Burner 52, fueled by natural gas, is ignited to heat nozzle 50 and the char in reaction zone 44, the flue gases from burner 52 being discharged into reaction zone 44. When the char at the mouth of zone 45 reaches combustion temperature, air flow through pipe 49 to tuyeres 47 is begun at low rate to increase char combustion and begin gasification. The system pressure controls are set, the recycle blowers actuated and the system gradually brought up to low capacity. Flow control 81 (FIG. 2) is actuated, and condensate and steam controls activated on regeneration gas exchanger 77 and sulfur condenser 78. Lime circulation is begun and temperatures brought to normal operating levels. The hot lean gas temperature is set to hold the desired heat balance. When hot-bed cleanup 12 and pyrolysis heat element 23 have reached normal level temperatures, coal is substituted for char feed and rate set at normal feed rates.

Operations through this startup period employ methanol feed to gas turbine 15 for power generation and both rich and lean gases produced are vented to a flare (not shown). Lean gas, stream 19 (FIG. 2), at this time is substituted for methanol to fuel turbine 15 and the remaining rich gas product stream 20 (FIG. 2) is closely monitored for quality in anticipation of its diversion to methanol plant 14 (FIG. 1).

Controls 82, 83, 84 and 85 of regeneration chamber 21 are set to begin air addition to establish normal lime reneneration conditions while rich gas offtake and regeneration gas bleed are set to maintain their respective pressure balances. The sulfur and slag blowdown are monitored for expected rates of production. Also monitoring takes place of the following: coal feed, flare system, lime inventory levels in hot-bed cleanup 12 and hot-bed cleanup 13, char level in gasification chamber 11, rejection of particulates in the lime circulation system, gas analyses of $H_2$ and CO in rich gas and $N_2$ in the lean gas.

Once the system is in steady state, the operation proceeds with the lean gas remaining split into two streams, 18a which is directed to hot-bed cleanup 12, and stream 18b which is directed to pyrolysis chamber 10. The lean gas (low Btu gas) formed in reaction zone 44, is in the range of 2650° F. to 2800° F. (slagging temperature) and its composition is mainly CO, $CO_2$ and $N_2$ with $N_2$ being the predominant component. As this low Btu gas rises it meets an inventory of hot char. The lean gas raises the temperature of the char and the $CO_2$ reverts to CO. Any hydrocarbons contained in the lean gas are cracked by virture of the temperature of the lean gas (around 2200° F.) at the top of zone 43.

The rich gas (gases and vapors) derived from pyrolysis are directed to the top of hot-bed cleanup 12 via duct or stream 17, and are filtered through the bed to thermally cause the molecular rearrangement of the gases and vapors of pyrolysis to result in a clean, sulfur-free rich gas (syngas) of $H_2$ and CO with $H_2$ being the dominant component. Steam addition to stream 17 (FIGS. 1 and 2) prior to entry into hot-bed cleanup 12, is adjusted to yield the appropriate proportions of $H_2$ and CO in the rich gas (syngas). For making methanol a ratio of 2+ $H_2$ to CO required. If methane is to be made from the rich gas (syngas) a ratio of 3+ $H_2$ to CO must be provided. The hot rich gas (syngas) for methanol emerges from the bottom of hot-bed cleanup 12 (FIG. 8) and is cooled in heat exchanger 76 prior to being directed to methanol plant 14. Since the molecular rearrangement of the gases and vapors of pyrolysis is an endothermic reaction, heat must be supplied to hot-bed cleanup 12. As explained, hot lean gas stream 18a is used for this purpose; this stream which may be around 2200° F., enters the bottom of hot-bed cleanup 12 and emerges at the top. Stream 18a does not come in direct contact with the lime (sorbent) in the bed in order to heat the lime indirectly while at the same time keep both gases, the lean gas and the rich gas segregated. Lean gas stream 18b serves to indirectly heat the coal contained in heating element 23 in order to cause the release of gases and vapors of pyrolysis (as previously explained). The gases and vapors mainly include water evaporated from the coal, tars, light oils, $CH_4$, CO, $H_2$, and $NH_3$. These gases and vapors escape towards end 29 through fissures in the char mass and are directed out of gas separation zone 42 via stream 17. The hot char is extruded from discharge end 29 and dropped onto char-dump bell 46. Char is accumulated above dump bell 46 and is actuated intermittently to discharge the char into zone 43 of gasifier 11. Steam may be admitted to the bottom of the char accumulation area above bell 46 to discourage the mixing of cooler pyrolysis gases and the hotter (lighter) lean gas produced from gasification. The heat input for pyrolysis is supplied by passing hot lean gas (stream 18b) through annular jacket 24 surrounding heating element 23.

Figure 5:
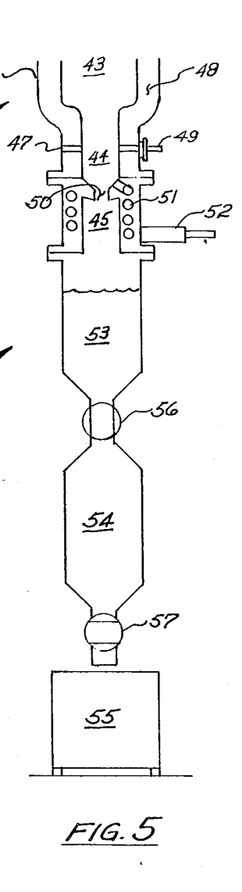
FIG. 5 is a view showing one possible arrangement of the slagging portion of the gasification chamber.

The broken char is rapidly heated in the upper portion of zone 43 of gasifier 11 by direct contact with the rising hot lean gas, and finally it is completely gasified in reaction zone 44 by reaction with air which is preferably preheated. It is to be noted that the very low levels of $CO_2$ formed during suppressed combustion in reaction zone 44 are shifted back to CO as the $CO_2$ rises through the bed of hot char. The gasification temperature is maintained high enough to melt the ash constituents of the char to yield an inert slag. The fluid slag drains continuously from central slag nozzle 50 which is maintained above the slag melting temperature by hot flue gas from burner 52 which flows through spiral annular passage 51. The hot flue gas from burner 52 is discharged near the inlet to the nozzle 50 where it joins the lean gas formed in reaction zone 44. The draining slag is quenched in quenching vessel 53 with water, and the slag in water is discharged intermittently through slag lock hopper 54 by means of control valves 56 and 57.

The rich gas (gases and vapors of pyrolysis), stream 17, enters hot-bed cleanup 12 at the top and is heated in contact with the lime. The orientation of the rich gas (gases and vapors) is arranged so that this gaseous feed from coal pyrolysis flows downward and is gradually heated in contact with the slowly moving lime. This reduces premature cracking of hydrocarbons in the vapor phase and surface deposition of soot. By exposing to a rising temperature profile within the lime, the rich gas permeates the lime pebbles and the large molecules of the hydrocarbons are catalytically rearranged within the lime pebbles. The resultant gas ($H_2$ and CO) is cooled in heat exchanger 76, analyzed in analytical equipment 86 (FIG. 8) and discharged under material balance control as feedstock to methanol plant 14. The spent lime from hot-bed cleanup 12 in the form of carbon-impregnated CaS enters regeneration chamber 21 (FIG. 8) where it meets an upwardly flowing stream of gas consisting predominantly $N_2$, CO and sulfur vapor. These regeneration product gases are generated low in chamber 21 where the air feed controlled by controller 87, reacts with the CaS and carbon to yield CO and S. This air feed is diluted with a recycle stream of tail gas to limit the peak regeneration temperature. Some steam also may be injected for temperature control and also for causing a carbon-steam reaction to denude the impregnated carbon in the pellets and make them more porous again. Controllers 89 and 90 are used for this purpose.

The exiting regeneration gas is partially cooled in exchanger 77 to above the dew point of sulfur and is then further cooled to condense the sulfur in condenser 78. The tail gas from condenser 78 is recycled by blower 80 and excess tail gas is discharged to join lean gas stream 18a after its emergence from hot-bed cleanup 12. Stream 18b from pyrolysis chamber 10 joins stream 18a to form stream 18 again. The lean gas is desulfurized in hot-bed cleanup 13 by direct contact with the recycled lime from surge hopper 66. Analyzer 91 and controller 92 adjust the pressure in gasifier 11 by building up or by reduction of back pressure. The lime is withdrawn from the bottom of regeneration chamber 21 via star valve 68 and lifted to surge lock hopper 66 on top of hot-bed cleanup 13. The flow of lime from hot-bed cleanup 13 to hot-bed cleanup 12 is controlled by star valve 67. Therefore according to the arrangement shown, the fresh regenerated lime first cleans the lean gas, and then the raw rich gas.

Subsequent to the cleanup of the lean gas in hot-bed cleanup 13, the gas is directed to gas turbine 15 to be burned while still under pressure (350 psi) and somewhat hot (about 800° F.) to produce electric power. The waste heat from gas turbine 15 is directed to a waste heat boiler (not shown but known in the art) and the steam raised in such boiler is then directed to steam turbine 16 where additional power is produced. The two systems of power production via gas turbine 15 together with power production via steam turbine 16 are commonly known as combined cycle power generation and accepted to be the most efficient method of producing electric power that is commercially available at the present time.

The above description explains the cogeneration of liquid transport fuel (methanol) and electric power from coal in a cost-effective and environmentally acceptable manner as applied to a "new grassroots" application. It is to be noted that the instant invention is also applicable to the repowering of existing coal-burning, power-producing facilities wherein the existing coal handling, boiler, generator and services are used.

The instant invention is especially applicable to boilers of 100 MWe and larger. Since 85 percent of the transboundary emissions originates from coal-burning utility boilers, it is imperative to drastically curtail the emission from these boilers. The instant invention can solve this problem by repowering these boilers in such a way as to cogenerate methanol and electric power and make constructive use of these existing facilities. This is accomplished by replacing the present pulverized coal burners with low Btu gas burners, and on the premises of these coal-burning facilities, the method as shown in FIG. 1 is installed independently of the existing equipment with the exception that the low Btu gas after it emerges from hot-bed cleanup 13 is divided into two additional and separate streams: one such stream of low Btu gas (after expanding from 350 psi to 5 psi) is directed to the existing boiler and the other stream to the combined cycle (gas turbine 15 and steam turbine 16). It is known in the art to which this invention pertains, that when low Btu gas is burned in an existing coal-fired boiler the rating of the boiler comes down to about 60% of its design capacity. For this reason the combined cycle is incorporated in order to make up the loss caused by such derating. In so doing the following benefits are derived:

1. The existing boilers can be used with negligible alteration.
2. There is an increase in capacity by virtue of the combined cycle.
3. High maintenance equipment such as the pulverization mills, the precipitator and ash handling are eliminated.
4. The availability of the plant is increased.
5. There are valuable credits from by-products such as the methanol, slag and sulfur which pay for the repowering, thus providing pollution control at no cost.
6. Positive cash flows are created by virtue of such repowering.

All in all it is submitted that the instant invention provides a method for the cogeneration of clean liquid fuels for transport (and other artificial chemicals) and clean electric power from gasifiable materials such as coal in a cost effective, environmentally acceptable manner, and that this invention is applicable to new facilities as well as to the repowering of existing coal-burning facilities, and that this invention responds to this country's two most critical needs; namely, clean liquid transport fuel and clean electric power from abundant domestic natural resources as for example coal.

I claim:

1. A method of generating a de-sulphurized volatile matter and a relatively low Btu gas comprising the steps of:
   (a) pyrolyzing coal to produce volatile matter and a char;
   (b) feeding the volatile matter to a first de-sulphurizing means containing a de-sulphurizing agent to remove sulphur from the volatile matter;
   (c) gasifying the char to produce a relatively low Btu gas;
   (d) feeding the relatively low Btu gas to a second de-sulphurizing means also containing the de-sulphurizing agent to remove sulphur from the relatively low Btu gas;
   (e) providing a regenerating means for removing sulphur from the de-sulphurizing agent; and
   (f) moving at least portions of the de-sulphurizing agent from the second de-sulphurizing means to the first de-sulphurizing means, from the first de-sulphurizing means to the regenerating means, and from the regenerating means to the second de-sulphurizing means.

2. The invention defined in claim 1 wherein step (d) further includes the prior step of feeding at least a portion of the relatively low Btu gas about a means for pyrolyzing the coal to indirectly increase the temperature of said pyrolyzing means before said step of feeding the relatively low Btu gas to the second de-sulphurizing means.

3. The invention defined in claim 1 wherein step (d) further includes the prior step of feeding at least a portion of the relatively low Btu gas about the first de-sulphurizing means to indirectly increase the temperature thereof before said step of feeding the relatively low Btu gas to the second de-sulphurizing means.

4. The invention defined in claim 3 wherein the temperature of the first de-sulphurizing means is increased to a sufficient temperature as to convert the de-sulphurized volatile matter to a syngas.

5. The invention defined in claim 1 wherein step (c) further includes the step of directing air to a means for gasifying the char so as to produce such relatively low Btu gas which, when burned, will produce low levels of NO$_x$.

6. The invention defined in claim 1 further including the initial steps of providing a generally horizontal chamber for pyrolyzing coal and of providing a generally vertical chamber for gasifying char, the output of the pyrolyzing chamber being connected to the input of the gasifying chamber.

7. The invention defined in claim 6 wherein step (a) further includes the steps of feeding the volatile matter and the char to a separation zone and maintaining the separation of the volatile matter produced during pyrolysis of the coal and the relatively low Btu gas produced during gasification of the char.

8. The invention defined in claim 7 wherein said step of maintaining the separation of the volatile matter and the relatively low Btu gas includes using a mechanical device to maintain such separation.

9. The invention defined in claim 7 wherein said step of maintaining the separation of the volatile matter and the relatively low Btu gas includes using steam injection to maintain such separation.

10. The invention defined in claim 1 wherein said de-sulphurized volatile matter is converted to a syngas and used to produce methanol.

11. The invention defined in claim 1 wherein said de-sulphurized relatively low Btu gas is used to produce electric power.

12. A method of generating a de-sulphurized volatile matter and a relatively low Btu gas comprising the steps of:
   (a) pyrolyzing coal to produce volatile matter and a char;
   (b) feeding the volatile matter to a first de-sulphurizing means containing a de-sulphurizing agent to remove sulphur from the volatile matter;
   (c) gasifying the char to produce a relatively low Btu gas;
   (d) feeding a portion of the relatively low Btu gas about the first de-sulphurizing means to indirectly increase the temperature thereof;
   (e) combining the portion of the relatively low Btu gas fed about the first de-sulphurizing means with the remaining portion of the relatively low Btu gas from step (c);
   (f) feeding the combined portions of the relatively low Btu gas to a second de-sulphurizing means also containing the de-sulphurizing agent to remove sulphur from the relatively low Btu gas;
   (g) providing a regenerating means for removing sulphur from the de-sulphurizing agent; and
   (h) moving at least portions of the de-sulphurizing agent among the first de-sulphurizing means, the second de-sulphurizing means, and the regenerating means such that the regenerating means regenerates the de-sulphurizing agent.

13. The invention defined in claim 12 wherein said step (d) further includes the step of feeding the remaining portion of the relatively low Btu gas about a means for pyrolyzing the coal to indirectly increase the temperature of said pyrolyzing means.

14. The invention defined in claim 12 wherein said step (h) is performed by moving at least portions of the de-sulphurizing agent from the second de-sulphurizing means to the first de-sulphurizing means, from the first de-sulphurizing means to the regenerating means, and from the regenerating means to the second de-sulphurizing means.

* * * * *